United States Patent
Baigas, Jr.

[11] Patent Number: 5,271,997
[45] Date of Patent: Dec. 21, 1993

[54] LAMINATED FABRIC MATERIAL, NONWOVEN TEXTILE PRODUCT

[75] Inventor: Joseph F. Baigas, Jr., Charlotte, N.C.

[73] Assignee: Kem-Wove, Incorporated, Charlotte, N.C.

[21] Appl. No.: 842,470

[22] Filed: Feb. 27, 1992

[51] Int. Cl.5 ............................................ B32B 5/02
[52] U.S. Cl. ............................ 428/233; 428/212; 428/236; 428/280; 428/288; 428/297; 428/224; 428/284; 428/298
[58] Field of Search ............... 428/212, 233, 234, 235, 428/236, 280, 297, 298, 302, 224, 171, 220, 218, 288, 284

[56] References Cited

U.S. PATENT DOCUMENTS

| | | | |
|---|---|---|---|
| Re. 32,171 | 6/1986 | van Turnhout | 55/155 |
| 4,250,172 | 2/1981 | Mutzenberg et al. | 428/234 |
| 4,397,907 | 8/1983 | Rosser et al. | 428/240 |
| 4,411,948 | 10/1983 | Ogino et al. | 428/283 |
| 4,540,625 | 9/1985 | Sherwood | 428/283 |
| 4,668,562 | 5/1987 | Street | 428/218 |
| 4,751,134 | 6/1988 | Chenowelth et al. | 428/297 |
| 4,753,693 | 6/1988 | Street | 156/62.8 |
| 4,765,812 | 8/1988 | Homonoff et al. | 428/283 |
| 4,821,274 | 7/1989 | D'Elia | 428/287 |
| 4,828,913 | 5/1989 | Kiss | 428/283 |
| 4,882,217 | 11/1989 | Fitzpatrick | 428/280 |
| 4,906,513 | 3/1990 | Kebbell et al. | 428/283 |
| 4,944,992 | 7/1990 | Yoneshige et al. | 428/288 |
| 4,946,738 | 8/1990 | Chenowelth et al. | 428/297 |
| 4,957,804 | 9/1990 | Hendry et al. | 428/288 |
| 5,013,309 | 5/1991 | Baigas, Jr. et al. | 604/368 |
| 5,079,074 | 1/1992 | Steagall et al. | 428/280 |

OTHER PUBLICATIONS

Ambersorb ® Carbonaceous Adsorbents, Technical Notes, Specialty Publication.
Moldability of Rhoplex Tr-407, Technical Service Notes, Aug. 1, 1990.
Christy ® Dry Material Dispensing Machines, Christy Machine Company.

*Primary Examiner*—James J. Bell
*Attorney, Agent, or Firm*—Bell, Seltzer, Park & Gibson

[57] ABSTRACT

A laminated fabric material, a nonwoven textile product used to make that material and methods of making each are disclosed. The nonwoven textile product includes a compressed nonwoven textile batt of textile staple fibers and a cured binder disposed substantially throughout the batt. The textile product is suitable as a substitute for foam backing layers in the production of laminated fabric materials.

27 Claims, 3 Drawing Sheets

LAMINATED FABRIC MATERIAL, NONWOVEN TEXTILE PRODUCT

FIELD OF THE INVENTION

This invention relates to a nonwoven textile product and more particularly to a nonwoven textile product that is suitable as a replacement for synthetic foam materials in padding and laminating contexts.

BACKGROUND OF THE INVENTION

In the textile industry, it is common to laminate various sorts of fabric material, such as upholstery fabric or other knit or woven fabrics, to a foam binding layer to provide the fabric with increased structural integrity or to provide padding to whatever article the fabric is ultimately applied. Examples of such usages include upholstery material for automobile interiors or furniture, linings to certain clothing items, or wall covering fabrics used in interior design. In such applications, the synthetic foam materials are typically laminated to the fabric material via an adhesive or, in some cases, thermal or "melt" bonding.

Depending on how they are used, such foam materials present several problems to the manufacturing industry as well as the end user. First, and perhaps foremost, the manufacture and disposal of synthetic foam materials, often made of polyurethane or polyester, pose significant handling problem and negative environmental effects. These problems are associated with the toxic and nonbiodegradable nature of the chemicals, such as toluene diisocyanate, used to produce the foam material and the foam products. In addition, such products, when exposed to flame, produce toxic gases and other by-products which can severely, if not completely, exacerbate life rescue attempts from buildings or automobiles where the materials are used or manufactured. Moreover, because such materials are often used in small thicknesses, they are often highly fragile and thus present handling problems during the lamination process. Still further, such materials are often susceptible to chemical decomposition or breakdown over long periods of time.

Nonwoven materials of various types have been explored as possible substitutes for synthetic foams in various environments. However, to date, such efforts have been generally unsuccessful, producing products having poor uniformity, poor density and poor delamination qualities.

Accordingly, it is an object of the present invention to provide a product suitable for use as a backing layer for fabrics, which product provides both integrity to the fabric material and padding to the articles to which the laminated material is applied.

Further, it is an object of the present invention to provide an environmentally safe and nontoxic alternative to foam materials for the laminated fabric industry.

In addition, it is an object of the present invention to provide a backing material which maintains its structural integrity and is not susceptible to chemical decomposition or breakdown.

Still further, it is an object of this invention to provide a backing material that is durable during the manufacturing and laminating stages and which is less expensive to make and use than other known materials.

SUMMARY OF THE INVENTION

These and other objects and advantages of the present invention have been accomplished by providing a nonwoven textile product including a compressed nonwoven textile batt of textile staple fibers and a binder disposed substantially throughout the batt. The batt from which the textile product is made, before the addition of binder thereto and compression thereof, exhibits a Frazier permeability of at least 535 as measured by the ASTM D-737 method. The binder, when added to the batt and cured, serves to hold the batt in its compressed state. Due in large part to how it is produced, the batt exhibits balanced machine direction/cross direction strength characteristics because the fibers which make up the batt are arranged therein in each of the x-, y- and z-directions. The product is suitable, according to the present invention, as a substitute for foam as a backing layer in the production of laminated fabric materials. The textile product of the present invention overcomes the above mentioned disadvantages associated with the manufacture and use of foam materials in this context.

The textile product of the present invention can be made by assembling a mixture of suitable textile staple fibers and processing the mixture through an air-card assembly to separate the mixture into individual fibers. The individual fibers are passed through a downwardly blowing and baffled air curtain and then accumulated on a conveyor moving away from the air-card assembly. The conveyor is operated at a take-off speed such that the batt produced exhibits a Frazier permeability of at least 535 as measured by the ASTM D-737 method. Next, a binder is sprayed or otherwise applied to the batt to dispose the binder substantially throughout the interior of the batt. The binder is then dried to its "B" stage, compressed and cured to produce the nonwoven textile product of the present invention.

This nonwoven textile product can then be laminated to a fabric layer by ordinary means to produce an overall laminated fabric material, which material overcomes the problems and disadvantages outlined above with respect to foam-backed laminated materials.

BRIEF DESCRIPTION OF THE DRAWINGS

In the detailed description of the preferred embodiment of the invention presented below, reference is made to the accompanying drawings, in which.

DETAILED DESCRIPTION OF THE PREFERRED EMBODIMENT

Figure 1:
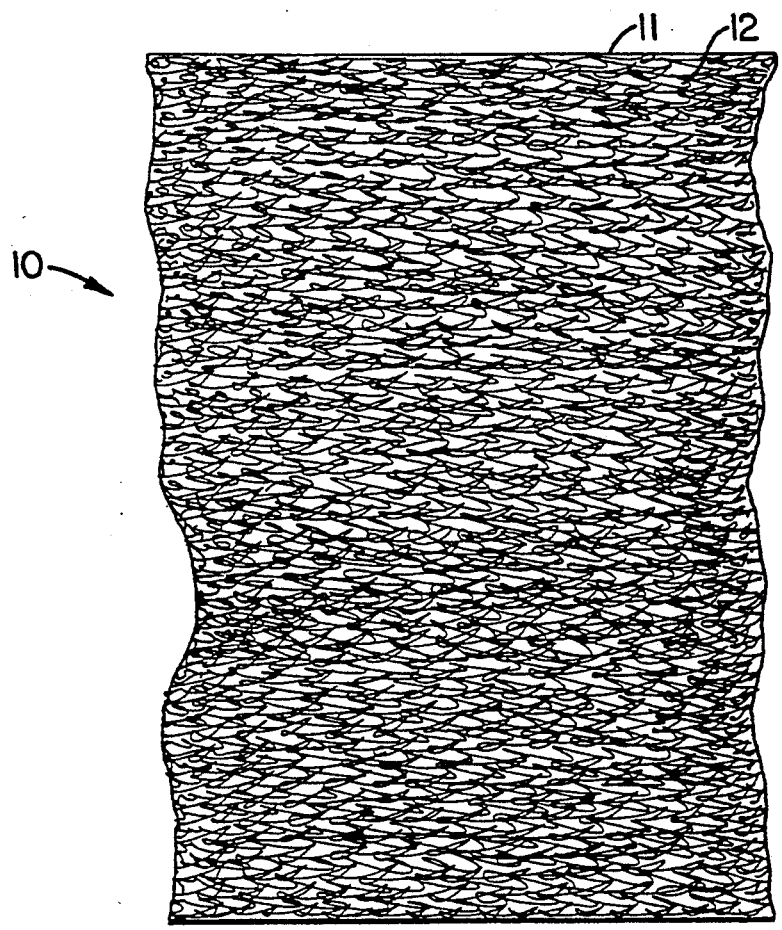
FIG. 1 is a perspective view of an embodiment of the textile product of the present invention in an uncompressed state.

With reference to the figures, FIG. 1 illustrates a nonwoven textile product of the present invention. As shown, the product 10 includes a nonwoven unitary batt 11 of textile staple fibers 12. The batt has a fiber make-up or composition and an overall thickness such that the Frazier permeability of the batt, when measured according to ASTM D-737 method, is at least 535.

The Frazier permeability of the batt is inversely proportional to both the density of the batt and its thickness. This permeability is important inasmuch as it is an indication of the degree of binder penetration which can be achieved within the batt by normal procedures. Since the degree of binder penetration achieved within the batt affects, as the present inventor has found, the overall integrity of the batt against delamination, the integrity of the batt can be controlled and thus optimized by manipulating the density and thickness of the batt.

The density of the batt is related to its fiber make-up or, in other words, the various denier of the fibers used to produce the batt. As indicated below, at small thicknesses, the density of the batt can be higher without sacrificing too much of its Frazier permeability. Thus for small thicknesses, the batt may be constructed of a single denier of fibers. However, where larger thicknesses are required by the intended end use, the negative effect of added thickness can be compensated for by including within the batt fibers of increasingly divergent denier.

As a general guide, the following table can be used to aid the artisan in choosing appropriate thicknesses and fiber constitution for the batt to achieve appropriate Frazier permeability and thus satisfactory binder penetration. The examples shown in the table are each constructed of polyester fiber, although similar results can be expected where other synthetic materials or natural fibers are used.

| Weight Oz/yd$^2$ | Fiber denier | Frazier Permeability ASTM D-737 | Original Thickness | Binder Penetration |
|---|---|---|---|---|
| 3 | 100%–4.75 | 760 | 0.40 | Complete |
| 3 | 50%–1½ 50%–1¼ | 375 | 0.25 | Incomplete |
| 4 | 50%–4.75 25%–6 25%–1½ | 750 | 0.45 | Complete |
| 6 | 100%–6 | 760 | 0.75 | Complete |
| 8 | 20%–15 80%–6 | 535 | 1.25 | Complete |
| 11 | 50%–6 50%–15 | 483 | 1.75 | Incomplete |
| 11 | 80%–15 20%–6 | 580 | 1.75 | Complete |
| 13.6 | 80%–15 10%–6 10%–25 | 540 | 2.25 | Complete |
| 15 | 80%–15 20%–25 | 560 | 3.00 | Complete |

Batts according to the present invention may be produced in any width or length required by the intended end use, or in standard sizes for die cutting, etc. as needed for lamination to fabric materials of any size or shape.

If desired, and as shown in some of the examples in the table above, two or more different denier of fibers may be used to accommodate increased batt thickness while maintaining satisfactory Frazier permeability. There is no general rule for choosing the appropriate denier for such arrangements, other than that mentioned above related to overall thickness and permeability. This notwithstanding, the batt will preferably be constituted of at least two different deniers of fibers where the large fiber denier will be at least 50% larger than the smaller fiber denier. More preferably, the larger fiber denier will be 100% larger than the smaller fiber denier.

In addition, if added structural integrity within the batt is desired, thermally-responsive fibers, such as DACRON polyester (marketed by the DuPont Company) or KODEL polyester (marketed by Eastman Kodak) may be disposed throughout the batt. These fibers will melt-bond with other fibers in the batt during the curing process, thus lending additional strength thereto. The amount of such fibers used in any given instance will vary according the amount of added strength required, but will generally be from ten to twenty weight percent compared to the overall fiber weight of the batt. Such fibers are particularly useful where the permeability of the batt is low due to high fiber density or increased overall thickness.

Once the batt is formed, a binder material is sprayed or otherwise applied to the batt and allowed to flow into the interior thereof. A sufficient quantity of binder per unit area should be used to achieve sufficient coverage. In general, this amount will vary with thickness of the batt, but will generally be applied at a binder:fiber weight ratio of at least 20:80. Optimum ratios will vary according to need. Surfactants may be admixed with the binder to form a sprayable emulsion.

Ordinary spraying means, such as a spray system using reciprocating or fixed spray nozzles aimed at one or both sides of the batt may be used. An exemplary spraying system includes multiple reciprocating nozzles supported by 100 to 500 psi of airless pressure. Elliptical nozzle orifices having a diameter of from 0.026 inches to 0.1 inches are preferred. Such orifices produce a flat triangular spray pattern that varies in spray angle from about 80° to 120° relative to the moving batt. The height of the nozzles above the batt should vary from ten to eighteen inches.

Figure 2:
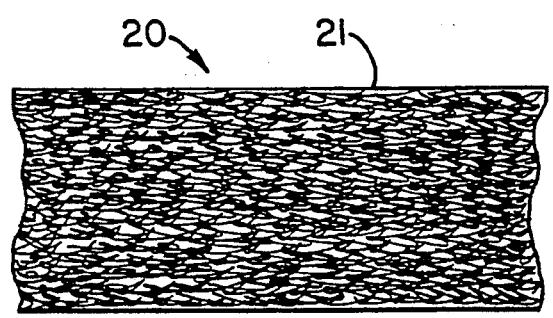
FIG. 2 is a perspective view of an embodiment of the textile product of the present invention in a compressed state.

As shown in FIG. 2, once the binder is applied to the batt, the binder is dried to an uncured or "B" stage, producing an intermediate product which can be rolled for storage and later use. In the alternative, the batt 21 may be immediately compressed to a desired thickness and the binder cured to hold the batt in its compressed state following the removal of the compressive force, thus forming the textile product 20 of the present invention.

Figure 3:
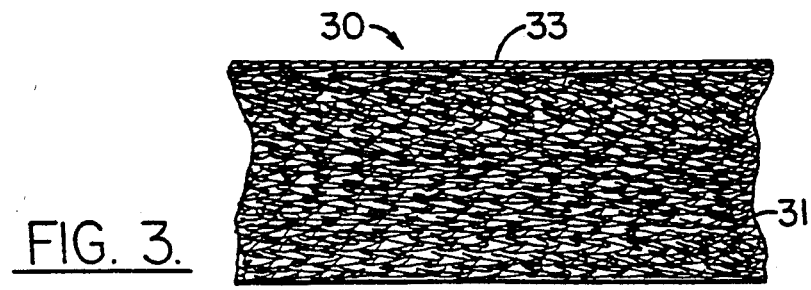
FIG. 3 is a perspective view of an embodiment of the laminated fabric material of the present invention.

As shown in FIG. 3, the laminated fabric material 30 of the present invention is made by bonding a fabric layer 33 to one side of the above described textile product 31. As will be understood, the bonding or laminating process can occur during the initial compression and curing steps or, in the alternative, may be done at a later stage. In either event, the lamination may be by way of an adhesive applied to the textile produce 31 or to fabric layer 33, or be accomplished by interposing an independent, dry, heat-activated adhesive layer between the two components and applying heat and pressure to the three-layered laminated for a sufficient time to melt the adhesive and thus bond the fabric layer 33 to the nonwoven textile product 31. Alternatively, textile product 31 may be bonded to the fabric layer 33 by thermal means wherein the textile product 31, the fabric layer 33 or an independent medial layer is made of a thermally-responsive fibers.

The textile product of the present invention may be made from most types of textile fibers including synthetic fibers of nylon, acrylic or polyester, such as polyester terephthalate; and natural fibers, such as cotton, silk, or wool. Additionally, mixtures of any of these fibers may be used. Flame resistant fibers, such as Trevera Fr Series fibers (marketed by Hoechst Celanese) may also be used to impart flame resistance to the various products.

Depending on the particular application, most any denier of fiber may be used. Generally speaking, for synthetic fibers, fibers of 3 to 60 denier may be used at lengths of ½ to 3 inches, preferably 1½ inches to 2½ inches. Crimp level is preferably from 9–13/inch of a sawtooth crimp. For natural fibers, any available cotton, silk or wool fibers may be used. For comparison, cotton fibers are equivalent in size to about a 1½ denier synthetic fiber. As will be understood, the hand or feel of the textile product will vary with its fiber content.

The binder used in the present invention should be curable by heat, radiation, and/or pressure, and be such that, when fully cured, will be stable, i.e. non-flowing, to temperatures as high as 350° F. In addition, the binder should be formable by heat and pressure from its dry, uncured "B" stage. A suitable binder is Rohm & Haas RHOPLEX TR-407, a self-crossing acrylic emulsion, although other binders having a $T_1$ (temperature at which the Torsional Module of air-dried film is 300 kg/cm$^2$) of about 30° C. are also useable to achieve satisfactory results. As indicated above, in order to obtain sufficient cohesion within the final product, the batt preferably contains a binder:fiber weight ratio of at least 20:80. Higher ratios may be needed for increasingly thicker batts, although the need for more binder can be compensated for by choosing a fiber make-up for the batt which will allow for complete binder loading within the batt.

Figure 4:
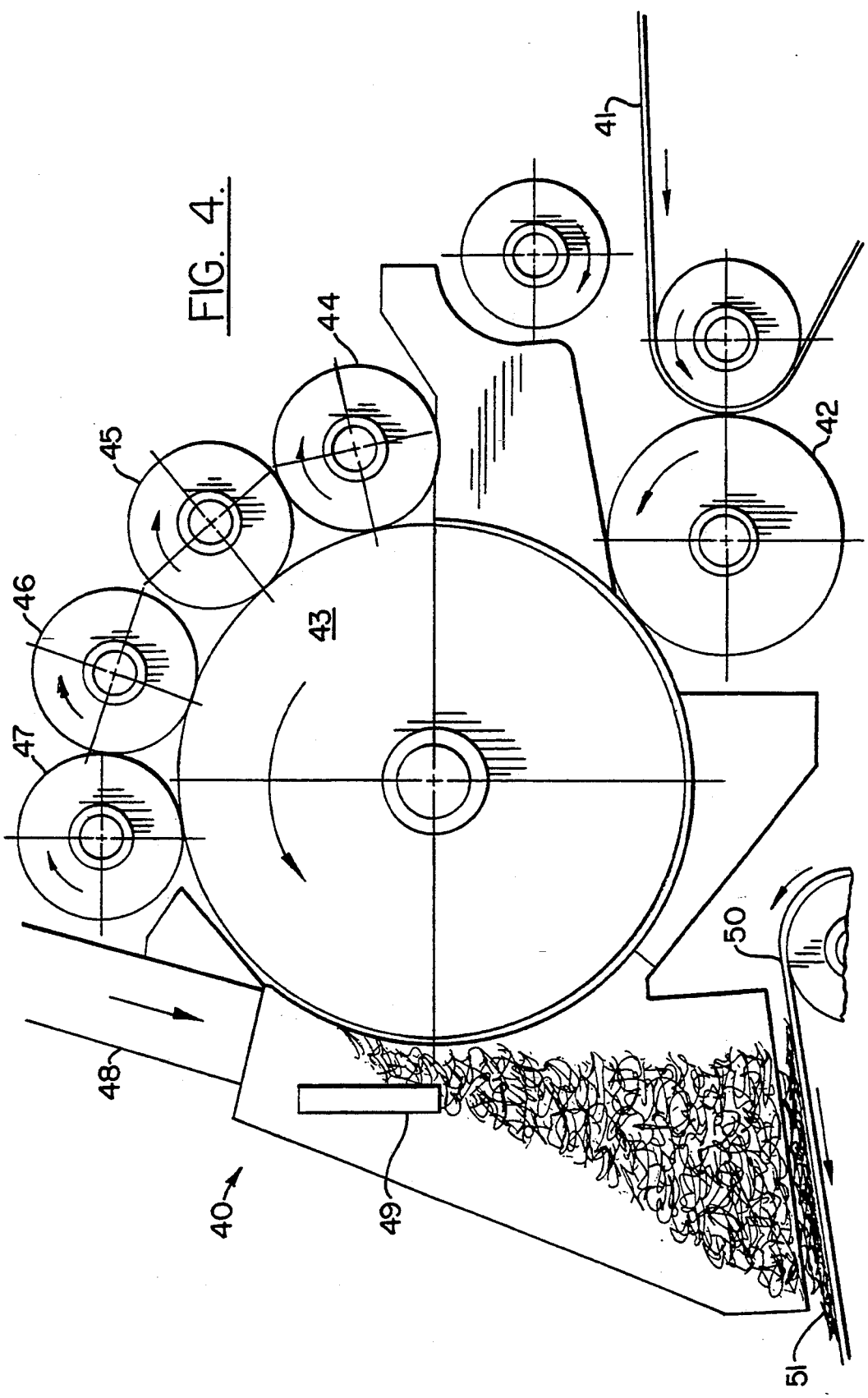
FIG. 4 is a schematic view of an air-card assembly for use in making the aforementioned product and material.

A preferred method of making the products and materials of the present invention can be explained with reference to FIG. 4. The first step of the method is to assemble a precursor mixture of suitable denier of textile staple fibers. This precursor mixture is fed into an air-card assembly 40 by feed conveyor 41 where it is lifted by a lifting roller 42 into contact with the main roller 43 of the assembly. The main roller 43, in conjunction with a series of opposing rollers 44, 45, 46, 47 separates the mixture into individual fibers and casts the same into a downwardly blowing air curtain produced by a blower 48. The air curtain is interrupted by a baffle member 49 to avoid classification of the fibers, producing a random, but uniform, arrangement of the various denier fibers within the air curtain. The air curtain forces the fibers downward where they are accumulated on a take-off conveyor 50 moving away from the air-card assembly 40. The accumulated fibers are randomly and three-dimensionally arranged on the conveyor 55 to form a nonwoven batt 51. By appropriately adjusting the various velocities of feed and take-off conveyors 41, 50, the main roller 43 and the blower 48, as well as the fiber content of the precursor mixture, the thickness and density of the batt 51 can be controlled to optimize the Frazier permeability of the batt as described above.

Once the nonwoven batt 51 is prepared, the curable binder is sprayed into the batt with enough force to dispose the binder substantially throughout the batt. The binder may then be dried to its "B" stage and the batt stored for later processing or the batt may be immediately compressed and, while compressed, exposed to whatever curing stimulus is needed for the particular binder being used. Suitable drying conditions will vary from binder to binder, but should be chosen to avoid any curing of the binder. Generally, this can be accomplished by exposing the batt to approximately 225° F. for about 30 seconds.

Figure 5:
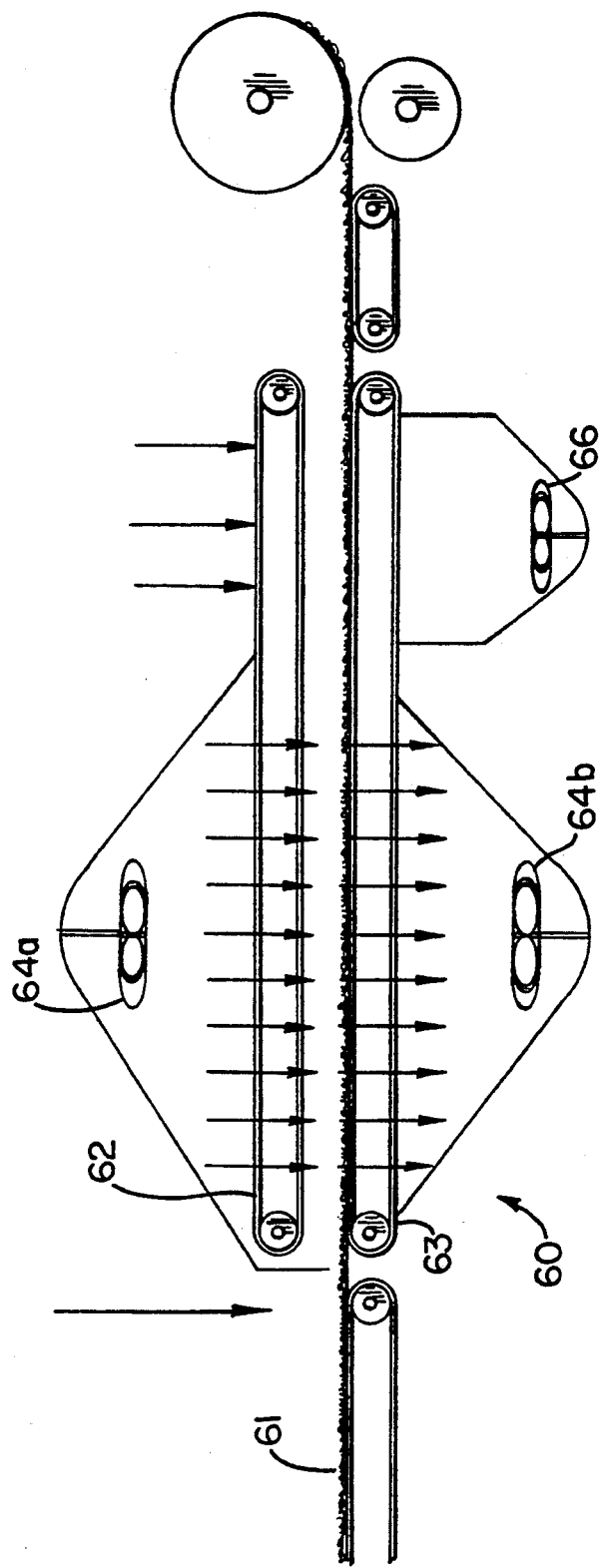
FIG. 5 is a schematic view of a curing and heating assembly for use in making the present inventions.

A suitable curing apparatus 60 is shown in FIG. 5, wherein the batt 61 is passed between two porous, parallel compression conveyors 62, 63, having heated air blowing downward through the moving batt produced by blowers 64a, 64b. Generally speaking, curing can be accomplished at temperatures ranging from 300° to 350° F. for 30 to 60 seconds. If RHOPLEX TR-407 is employed, the curing stimulus is a temperature of approximately 300° F. for 60 seconds.

After the curing process is complete, but while the batt is still under compression, the batt 61 is preferably cooled in a cooling chamber 65 fueled by blowing air from fan 66 and then rolled for storage. The cured and cooled binder will permanently maintain the compressed nature of the overall batt.

A typical product mix is as follows for a one inch thick pre- or "B" stage product:

| Fiber: | 6 denier × 2" polyester |
|---|---|
| Binder: | RHOPLEX TR 407 Acrylic |
| Fiber weight: | 4.0 oz./sq. yard |
| Binder weight: | 2.25 oz./sq. yard |
| Total weight: | 6.25 oz./sq. yard |
| Thickness: | 0.95" to 1.05" |

This "B" stage product has an average density of 0.52 pounds/foot$^3$ and can be compressed to about 4.0 pounds/foot$^3$ and ⅛ inches in thickness.

As indicated above, the cured nonwoven textile product may then be bonded to a suitable fabric layer to produce the laminated fabric material of the present invention. The laminated fabric material is a thin, pliable laminated fabric material suitable for the various uses described above. The final product exhibits a gauge coefficient of variation of less than about 1.0%, has a smooth, but porous, surface, is dimensionally stable through about 350° F., has excellent resilience and compressive resistance and is resistent to delamination. In addition, the batt exhibits a slow flame resistance when flame resistant fibers are used and has a reduced "off gas" toxicity.

It should be recognized that the embodiments and examples disclosed herein are shown to satisfy the disclosure requirements of U.S. patent law and are not intended to limit the scope of the present invention, the scope of the invention being defined in the claims hereinbelow.

That which is claimed is:

1. A nonwoven textile product suitable for use as a foam substitute, said product comprising a compressed nonwoven textile batt and a cured binder disposed substantially throughout said batt, said batt having a fiber make-up and overall thickness such that the Frazier permeability of said batt, before the addition of said binder thereto and any compression thereof, is at least 535 as measured by the ASTM D-737 method, said product having a binder:fiber weight ratio of at least 20:80, wherein said binder, when added to said batt and cured therein under compression of said batt, serves to maintain the compressed nature and thickness of said overall product.

2. A nonwoven textile product according to claim 1, wherein said batt comprises a mixture of at least two different denier of fibers.

3. A nonwoven textile product according to claim 1 wherein said batt comprises a mixture of at least two different deniers of fibers and the larger fiber denier is at least 50% larger than said smaller fiber denier.

4. A nonwoven textile product according to claim 1 wherein said batt comprises a mixture of at least two different deniers of fibers and the larger fiber denier is at least 100% larger than said smaller fiber denier.

5. A nonwoven textile product according to claim 1, wherein said fibers are three-dimensionally arranged within said batt.

6. A nonwoven textile product according to claim 1, wherein said fibers comprise synthetic fibers.

7. A nonwoven textile product according to claim 1, wherein said fibers comprise natural fibers.

8. A nonwoven textile product according to claim 1, wherein said fibers comprise thermally-responsive fibers.

9. A nonwoven textile product according to claim 1, wherein said fibers comprise flame-resistant fibers.

10. A nonwoven textile product suitable for use as a foam substitute, said product comprising a compressed nonwoven textile batt and a cured binder disposed substantially throughout said batt, said batt being constituted of a mixture of at least two different denier of synthetic fibers, wherein the larger synthetic fiber denier is at least 50% larger than the smaller synthetic fiber denier, said fiber constitution and the overall thickness of said batt being such that the Frazier permeability of said batt, before the addition of said binder thereto and any compression thereof, is at least 535 as measured by the ASTM D-737 method, said product having a binder:fiber weight ratio of at least 20:80, wherein said binder, when added to said batt and cured therein under compression of said batt, serves to maintain the compressed nature and thickness of said overall product.

11. A nonwoven textile product according to claim 10, wherein said larger fiber denier is at least 100% larger than said smaller fiber denier.

12. A nonwoven textile product according to claim 10, wherein said fibers are three-dimensionally arranged within said batt.

13. A nonwoven textile product according to claim 10, wherein said fibers comprise thermally-responsive fibers.

14. A nonwoven textile product according to claim 10, wherein said fibers comprise flame-resistant fibers.

15. A laminated fabric material comprising a textile fabric layer and a compressed nonwoven textile product bonded thereto, said product comprising a compressed nonwoven textile batt and a cured binder disposed substantially throughout said batt, said batt having a fiber make-up and overall thickness such that the Frazier permeability of said batt, before the addition of said binder thereto and any compression thereof, is at least 535 as measured by the ASTM D-737 method, said product having a binder:fiber weight ratio of at least 20:80, wherein said binder, when added to said batt and cured therein under compression of said batt, serves to maintain the compressed nature of thickness of said overall product.

16. A laminated fabric material according to claim 15, wherein said batt comprises a mixture of at least two different denier of fibers.

17. A laminated fabric material according to claim 15, wherein said batt comprises a mixture of at least two different denier of fibers and the larger fiber denier is at least 50% larger than said smaller fiber denier.

18. A laminated fabric material according to claim 15, wherein said batt comprises a mixture of at least two different denier of fibers and the larger fiber denier is at least 100% larger than said smaller fiber denier.

19. A laminated fabric material according to claim 15, wherein said fibers are three-dimensionally arranged within said batt.

20. A laminated fabric material according to claim 15, wherein said fibers comprise synthetic fibers.

21. A laminated fabric material according to claim 15, wherein said fibers comprise natural fibers.

22. A laminated fabric material according to claim 15, wherein said textile fabric layer comprises a nonwoven fabric layer.

23. A laminated fabric material according to claim 15, wherein said textile fabric layer comprises a woven fabric layer.

24. A laminated fabric material according to claim 15, wherein said fibers comprise thermally-responsive fibers.

25. A laminated fabric material according to claim 15, wherein said fibers comprise flame-resistant fibers.

26. An intermediate nonwoven textile product comprising a nonwoven textile batt and a curable binder disposed substantially throughout said batt, said batt having a fiber make-up and overall thickness such that the Frazier permeability of said batt, before the addition of said binder thereto and any compression thereof, is at least 535 as measured by the ASTM D-737 method, said product having a binder:fiber weight ratio of at least 20:80 and wherein said binder is dried to its "B" stage.

27. An intermediate nonwoven textile product according to claim 26, wherein said batt comprises a mixture of at least two different denier of fibers and the larger fiber denier is at least 50% larger than the smaller fiber denier.

* * * * *

UNITED STATES PATENT AND TRADEMARK OFFICE
CERTIFICATE OF CORRECTION

PATENT NO. : 5,271,997

DATED : December 21, 1993

INVENTOR(S) : Joseph F. Baigas, Jr.

It is certified that error appears in the above-identified patent and that said Letters Patent is hereby corrected as shown below:

Title page: Item [56]: References Cited

In the References, "4,821,274" should be --4,851,274--;

In the References, "Hendry" should be --Hendrix--;

In the References, "Chenowelth" should be --Chenoweth--

Signed and Sealed this

Twenty-third Day of August, 1994

Attest:

BRUCE LEHMAN

Attesting Officer

Commissioner of Patents and Trademarks